(12) United States Patent
Drinkwater

(10) Patent No.: US 10,444,517 B1
(45) Date of Patent: Oct. 15, 2019

(54) TELESCOPING STRAP ADJUSTER

(71) Applicant: Facebook Technologies, LLC, Menlo Park, CA (US)

(72) Inventor: Jared I. Drinkwater, Black Diamond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 176 days.

(21) Appl. No.: 15/730,602

(22) Filed: Oct. 11, 2017

(51) Int. Cl.
| | | |
|---|---|---|
| *G06F 1/16* | (2006.01) | |
| *G02B 27/01* | (2006.01) | |
| *A42B 1/22* | (2006.01) | |
| *A42B 3/14* | (2006.01) | |
| *A42B 7/00* | (2006.01) | |

(52) U.S. Cl.
CPC ..... *G02B 27/0176* (2013.01); *G02B 27/0149* (2013.01); *A42B 1/22* (2013.01); *A42B 3/142* (2013.01); *A42B 3/145* (2013.01); *A42B 7/00* (2013.01); *G02B 2027/0169* (2013.01)

(58) Field of Classification Search
CPC .............................. G06F 1/163; G06F 1/1637
See application file for complete search history.

(56) References Cited

U.S. PATENT DOCUMENTS

| | | | | |
|---|---|---|---|---|
| 4,749,256 A | * | 6/1988 | Bell | ............... G02B 27/0149 359/632 |
| 2002/0118506 A1 | * | 8/2002 | Saito | .................. G06F 1/163 361/679.03 |
| 2018/0055202 A1 | * | 3/2018 | Miller | ............ G02B 27/0176 |

* cited by examiner

*Primary Examiner* — Md Saiful A Siddiqui
(74) *Attorney, Agent, or Firm* — Fenwick & West LLP

(57) ABSTRACT

A telescoping strap adjuster is embodied as a gas spring that enables a head strap of a head mounted display system to be worn around an individual's head. The gas spring includes a piston rod that translationally displaces, which adjusts the size of an opening of formed by the head strap. In the default configuration, the piston rod of the telescoping strap adjuster is fully extended, thereby causing the head strap opening to be minimized. A user can provide a force input to enlarge the head strap opening and subsequently don the head mounted display system. Once the force input is ceased, the telescoping strap adjuster reverts towards its default configuration and tightens the head strap such that the opening is tailored for the user's head size.

20 Claims, 6 Drawing Sheets

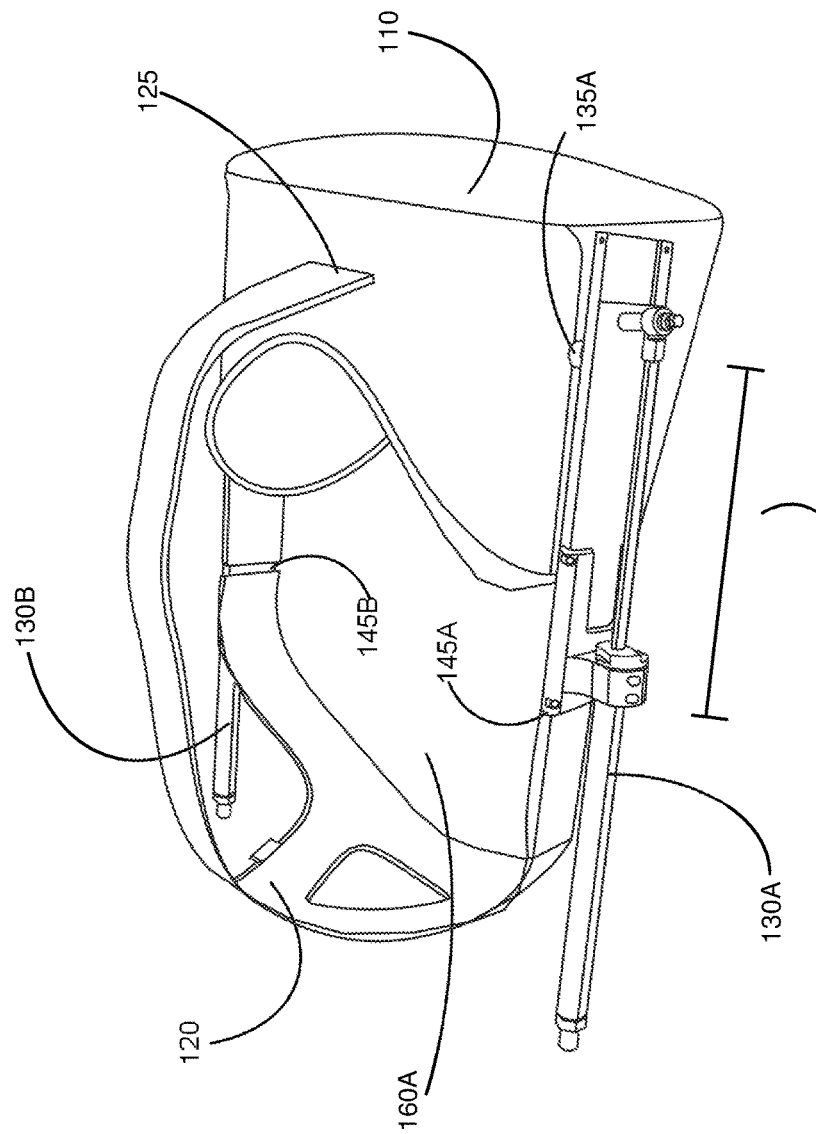

TELESCOPING STRAP ADJUSTER

BACKGROUND

This disclosure generally relates to head mounted displays, and more specifically to a telescoping adjustable strap that adjusts a head strap of a head mounted display.

Conventional head mounted display systems require a structure, such as a strap, to positionally affix the head mounted display relative to an individual that is wearing the head mounted display. However, precisely tailoring a strap for varying circumferences of the heads of different individuals can be difficult and inconvenient. As an example, a conventional head strap, such as an elastic band worn around an individual's head, can be susceptible to mechanical failure. In some cases, such conventional head straps affords users a level of control that is imprecise and are often sub-optimally tailored for a particular user. This is a problem particularly for head mounted display systems that need to be worn on the head of an individual. As head mounted display systems become more complex and heavier in weight, a conventional head strap cannot be comfortably worn by a user who is using the head mounted display system.

SUMMARY

Embodiments relate to a head mounted display system including at least one telescoping strap adjuster coupled to a head strap and a head mounted display. The telescoping strap adjuster enables the precise adjustment of the head strap such that the head mounted display can be comfortably worn by an individual. The telescoping strap adjuster includes a gas spring embodied as a cylinder and piston rod. As the piston rod translationally displaces relative to the cylinder, the movement of the piston rod is further translated to the head strap.

In one embodiment, the telescoping strap adjuster has a default position that is fully extended, which corresponds to a default head strap opening size. A user can provide a force input on the head strap to expand the head strap opening size such that the user can don the head mounted display on the user's head. Specifically, the provision of a force input causes the telescoping strap adjuster to compress. After termination of the force input on the head strap, the telescoping strap adjuster returns to its default position, thereby causing the head strap to return towards its default head strap opening size until the head strap opening size is tailored for the size of the user's head.

In various embodiments, the telescoping strap adjuster further includes an adjustable dial that alters the characteristics of the telescoping strap adjuster. For example, given that the telescoping strap adjuster is embodied as a gas spring, the adjustable dial can alter the spring constant of the gas spring. Thus, the user can adjust the adjustable dial to alter the rate at which the head strap returns towards the default head strap opening size when the force input is terminated. Additionally, the user can adjust the adjustable dial to tailor the looseness or tightness of the head strap to a desired extent.

BRIEF DESCRIPTION OF THE DRAWINGS

FIG. 1A is a perspective view of a head mounted display system in an extended configuration, in accordance with an embodiment.

DETAILED DESCRIPTION

Figure 1B:
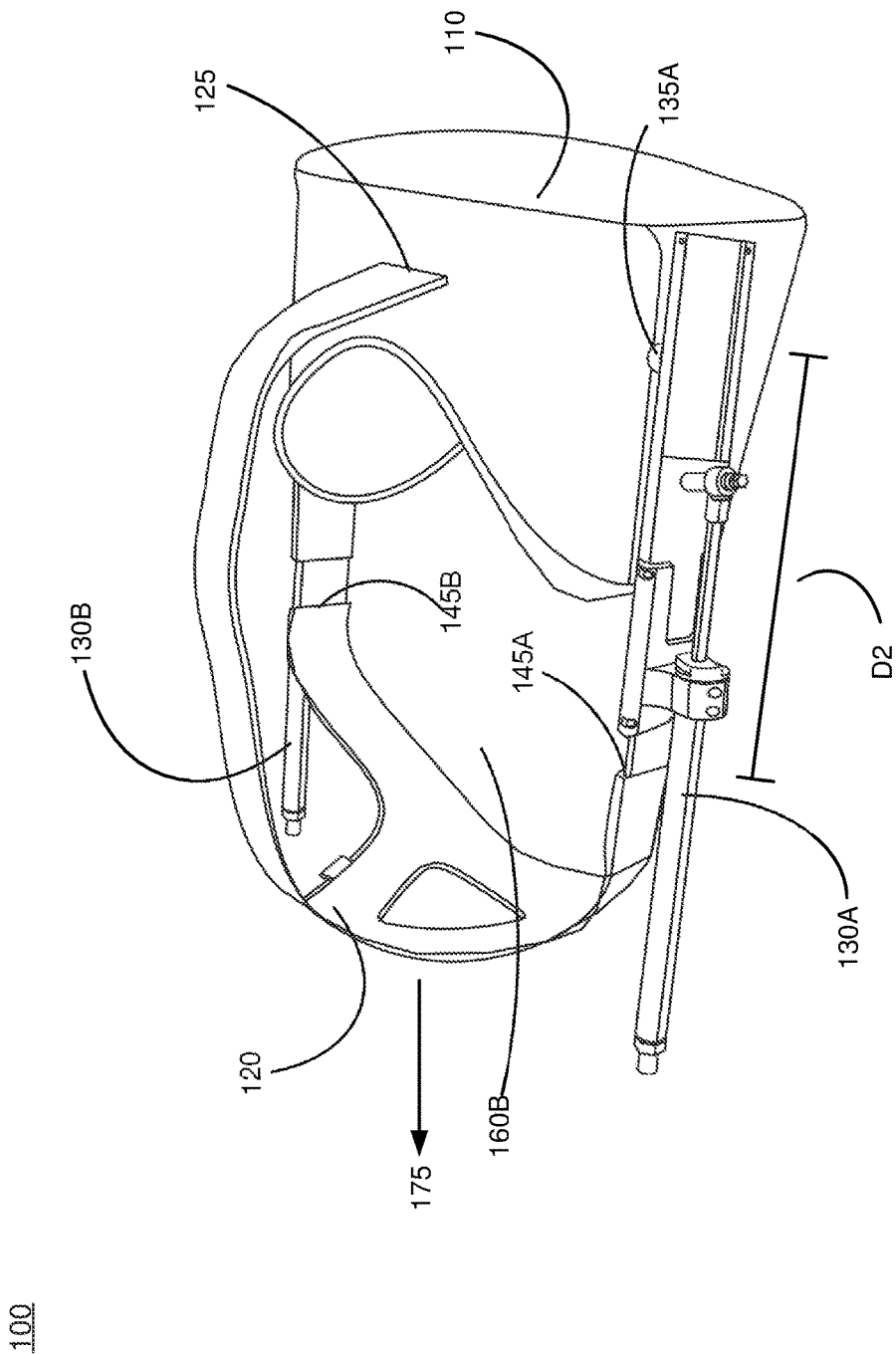
FIG. 1B is a perspective view of a head mounted display system in a compressed configuration position, in accordance with an embodiment.

Reference will now be made in detail to several embodiments, examples of which are illustrated in the accompanying figures. It is noted that wherever practicable similar or like reference numbers may be used in the figures and may indicate similar or like functionality. For example, a letter after a reference numeral, such as "telescoping strap adjuster 130A," indicates that the text refers specifically to the element having that particular reference numeral. A reference numeral in the text without a following letter, such as "telescoping strap adjuster 130," refers to any or all of the elements in the figures bearing that reference numeral (e.g. "telescoping strap adjuster 130" in the text refers to reference numerals "telescoping strap adjuster 130A" and/or "telescoping strap adjuster 130B" in the figures).

Embodiments relate to a head mounted display system that includes one or more telescoping strap adjusters that are attached to a head mounted display and a head strap that is suitable to be worn by a user. The one or more telescoping strap adjusters can include structural components embodied as a gas spring. Specifically, in a default configuration, the telescoping strap adjusters are fully extended, which causes an opening of the head strap to be reduced. A user can provide a force input to compress the telescoping strap adjusters, thereby enlarging the head strap opening. The user can subsequently don the head mounted display system. After the force input is ceased, the telescoping strap adjusters revert towards their extended configuration. Thus, as the user's head is located within the head strap opening, the telescoping strap adjusters extend until the head strap opening is tailored for the size of the user's head. The telescoping strap adjuster further includes an adjustable dial that can adjust the tightness or looseness of the head strap when worn by the user. Altogether, the telescoping mount adjuster enables the head strap of a head mounted display system to be specifically tailored for a user.

Overall Head Mounted Display System

FIG. 1A is a perspective view of a head mounted display system 100 in an extended configuration, in accordance with an embodiment. The head mounted display system 100 may include, among other components, a head mounted display 110, one or more telescoping strap adjusters 130A and 130 B, and a head strap 120. As used hereafter, the extended configuration refers to the configuration when each of the telescoping strap adjusters 130A and 130B are fully extended. For example, as the telescoping strap adjusters 130A and 130B are embodied as gas springs, the extended configuration refers to the fully extended state of the gas springs.

As shown in FIG. 1A, the head mounted display 110 is coupled to the head strap 120 at a coupling point 125 located on the top side of the head mounted display 110. Additionally, the head mounted display 110 is coupled to a telescoping strap adjuster 130A at a coupling point 135A located on a first side of the head mounted display 110. Although not shown, the head mounted display 110 further couples to a second telescoping strap adjuster 130B at a coupling point 135B located on a second side of the head mounted display 110. The first and second sides of the head mounted display 110 are opposite to one another. Each telescoping strap adjuster 130 couples with the head strap 120 at a coupling point 145A and 145B. Each of the coupling points 125, 135A, 135B, 145A, and 145B can employ one or more of adhesives (e.g., tape, glue, VELCRO), buttons, fasteners, and the like to couple the two components with each other.

Together, the head mounted display 110, the strap 120, and the telescoping strap adjusters 130A and 130B form an opening 160. The opening 160A can be expanded such that it can receive a user's head. In the extended configuration shown in FIG. 1A, the strap 120, and the telescoping strap adjusters 130A and 130B form a reduced opening 160A size. The size of the opening 160A is dependent on a linear distance D1 that is determined by the setting of the telescoping strap adjuster 130A and 130B. Specifically, as shown in FIG. 1A, the linear distance D1 is defined between coupling point 135A and coupling point 145A. A similar linear distance D1 exists between coupling point 135B (not shown) and coupling point 145B. The size of the opening 160A can be changed to be comfortably worn by individuals of varying head sizes by adjusting the linear distance D1. To adjust the size of the opening 160, portions of the telescoping strap adjuster 130A and 130B are configured to translationally (e.g., linearly) displace to adjust the linear distance D1.

Reference is now made to FIG. 1B, which is a perspective view of a head mounted display system 100 in a compressed configuration position, in accordance with an embodiment. As used hereafter, the compressed configuration refers to the configuration when each of the telescoping strap adjusters 130A and 130B are compressed. For example, as the telescoping strap adjusters 130A and 130B are embodied as gas springs, the compressed configuration refers to the gas springs in compression. Specifically, in this compressed configuration, the head mounted display includes a larger opening 160B size in comparison to the size of opening 160A in FIG. 1A. To achieve the compressed configuration, the head strap 120 of the head mounted display system 100 may receive a force input in the indicated direction 175. For example, a user can pull backwards on the head strap 120. As another example, the force input can be received in response to the user's head being inserted into the opening 160B. In response to the received force input, each of the telescoping strap adjusters 130A and 130B compresses. Specifically, each telescoping strap adjuster 130A and 130B translationally displace such that a larger linear distance D2 (larger in comparison to linear distance D1) exists between coupling point 135A and coupling point 145A. Similarly, the linear distance D2 between coupling point 135B (not shown) and 145B is larger than the linear distance D1 of FIG. 1A.

In the compressed configuration, a user can don the head mounted display system 100. After the force input is ceased, the telescoping strap adjusters 130A and 130B return towards the extended configuration depicted in FIG. 1A. Therefore, tension in the head strap 120 due to the telescoping strap adjusters 130A and 130B pulls the head mount display 110, and secures the individual's head in the opening 160B.

Example Telescoping Strap Adjuster

Figure 2:
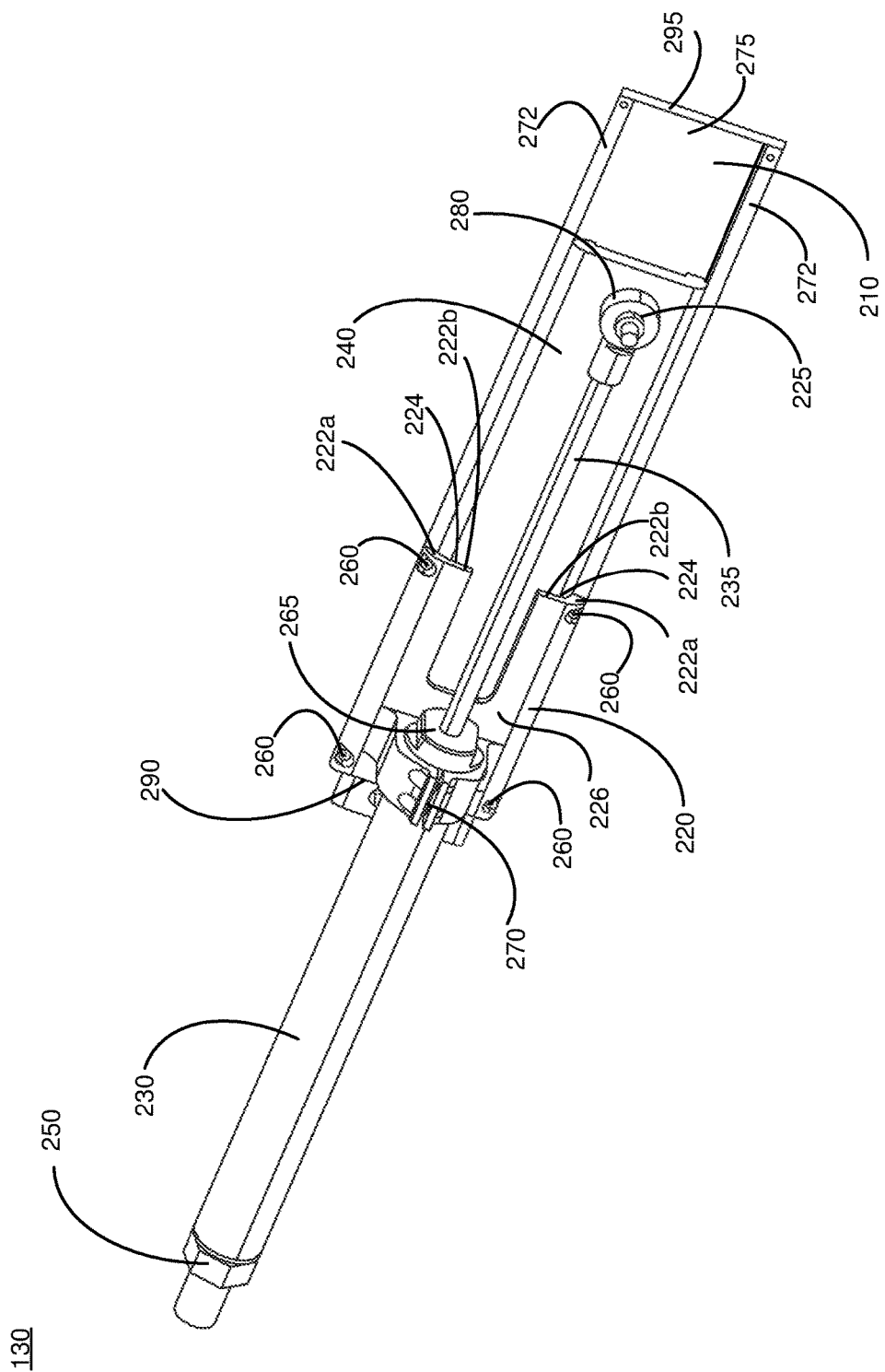
FIG. 2 is a front perspective view of the telescoping strap adjuster, in accordance with an embodiment.

FIG. 2 is a front perspective view of the telescoping strap adjuster 130, in accordance with an embodiment. The telescoping strap adjuster 130 may include, among other components, a plate 210, a brace 220, a cylinder 230, a dial 250, a piston rod 235, and a slider 240. Additionally, the telescoping strap adjuster 130 can include various securing structures such as a slider coupler 225, one or more screws 260, and a clamp 270.

Generally, the plate 210, the brace 220, the cylinder 230 are fixed to each other and move in conjunction. Additionally, the piston rod 235 and the slider 240 are fixed to one another and move in conjunction. The combination of the piston rod 235 and slider 240 linearly displaces relative to the combination of the plate 210, brace 220, and cylinder 230. Specifically, the piston rod 235 enters and exits through an end 265 of the cylinder 230, thereby enabling the slider 240 to be in various positions along the length of the plate 210.

Referring first to the plate 210 of the telescoping strap adjuster 130, it may have a first end 290 and a second end 295. The plate 210 is coupled with the head mounted display 110 (see FIGS. 1A and 1B) through coupling point 135, which is located in closer proximity to the second end 295 of the plate 210 in comparison to the first end 290 of the plate 210. Additionally, the plate 210 couples with the brace 220 through one or more screws 260. As shown in FIG. 2, the brace 220 is coupled to the plate 210 in closer proximity to the first end 290 of the plate 210 in comparison to the second end 290 of the plate 210. In various embodiments, the plate 210 is a flat, rectangular structure. In other embodiments, the plate 210 can be differently shaped.

The plate 210 may include one or more guides 272 along the top and bottom edges of the plate 210. The one or more guides 272 can be elevated in comparison to a flat portion 275 of the plate 210 so the edges of the guides 272 slidably support the slider 240. Altogether, the one or more guides 272 serve to guide the translational movement of the slider 240 along the flat portion 275 of the plate 210.

Referring to the brace 220, it is coupled to the clamp 270 which further couples with the cylinder 230 by clamping the exterior of the cylinder 230. The brace 220 may have a flat surface 226 that the clamp 270 is coupled to. The clamp 270 forms a hole through which the cylinder 230 is inserted through. The clamp 270 encircles the exterior of the cylinder 230 and clamps the cylinder 230 on a side of the cylinder 230. As shown in FIG. 2, the clamp 270 clamps the cylinder 230 on a side of the cylinder 230 that is opposite of the side of the cylinder 230 that is adjacent to the brace 220. As such, the brace 220 is fixed relative to the cylinder 230.

The brace 220 is further coupled to the plate 210 through one or more screws 260 located along the guides 272 of the plate 210. Thus, the brace 220 is fixed relative to the plate 210. Altogether, through the clamp 270 and the screws 260, the brace 220, cylinder 230, and plate 210 are fixed relative to one another.

In various embodiments, one or more parts of the brace 220 may be substantially curved. For example, as shown in FIG. 2, edge portions 222a of the brace 220 extend away from the plate 210 and linear portions 222b of the brace 220 run substantially parallel to the plate 210. Each edge portion 222a of the brace 220 can be in contact with the plate 210 and more specifically, in contact with a guide 272 of the plate 210. Each linear portion 222b of the brace 220 is a distance away from the plate 210. In other words, each linear portion 222b of the brace 220 and the plate 210 form a gap 224 within which the slider 240 resides. Therefore, the slider 240 can positionally displace by moving through the gap 224 formed between the linear portion 222b of the brace 220 and the plate 210. As shown in FIG. 2, the linear portions 222b of the brace 220 cover at least a portion of the slider 240. Therefore, the linear portions 222b of the brace 220 serve as barriers that prevent the slider 240 from displacing in directions away from the plate 210.

Referring now to the slider 240, the slider 240 may be a flat, rectangular structure, similar to the flat rectangular, structure of the plate 210. In various embodiments, the length of the slider 240 is shorter than the length of the plate 210. In various embodiments, the width of the slider 240 is shorter than the width of the plate 210. For example, as shown in FIG. 2, the width of the slider 240 is configured such that the slider 240 can reside within the flat portion 275 of the plate 210. In various embodiments, the width of the slider minimally differs (e.g., less than 10% difference) from the width of the flat portion 275 of the plate 210.

The slider 240 is further coupled to the piston rod 235 through a slider coupler 225. Therefore, any translational displacement experienced by the piston rod 235 is translated to the slider 240. In one embodiment, the slider 240 couples with a ringed end 280 of the piston rod 235 via the slider coupler 225. The slider coupler 225 can be embodied as a bolt and washer combination, though in other embodiments, other types of coupling systems can be employed. As one example, the bolt of the slider coupler 225 can extend through an opening of the ringed end 280 of the piston rod 235, thereby fixing the position of the piston rod 235 relative to the slider 240.

Figure 3:
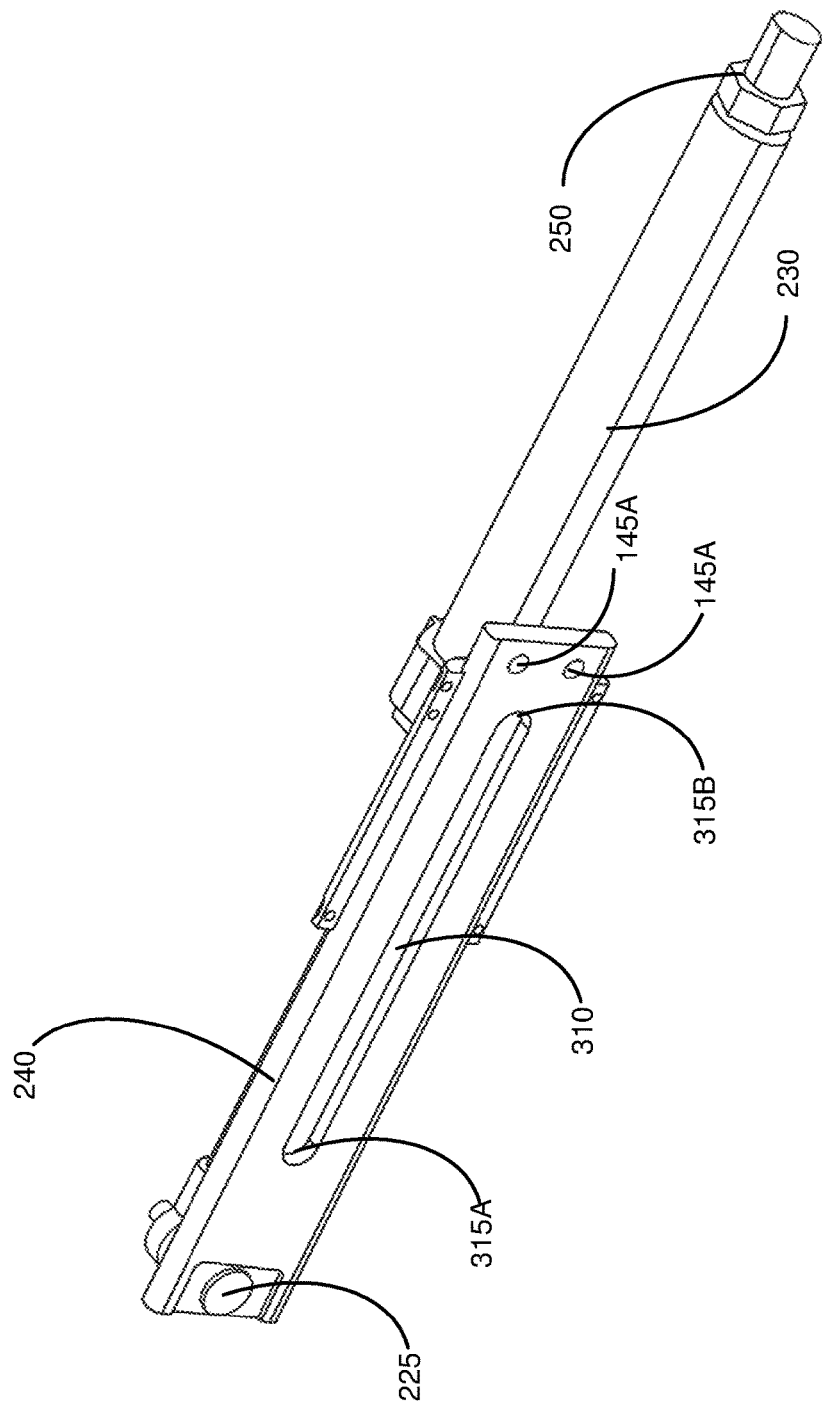
FIG. 3 is a back perspective view of the telescoping strap adjuster without a plate component, in accordance with an embodiment.

Reference is now made to FIG. 3, which depicts a back perspective view of the telescoping strap adjuster 130 without the presence of the plate 210, in accordance with an embodiment. Here, a portion of the slider coupler 225 may extend from a back of slider 240. Additionally, the back side of the slider 240 can further include one or more coupling points 145A that couples the telescoping strap adjuster 130 to the head strap 120 (see FIGS. 1A and 1B). Therefore, any translational displacement experienced by the slider 240 causes the head strap 120 to similarly displace.

In various embodiments, the slider 240 can further include a recess 310 along the length of the slider 240. As shown in FIG. 3, the recess 310 possesses a first end 315A and a second end 315B. The recess 310 is configured to couple with an opposing structure of the plate 210, thereby further providing stability to the translational displacement of the slider 240 as it moves relative to the plate 210. For example, the plate 210 includes a protrusion that extends from the plate 210. The protrusion enters into the recess 310 and prevents the slider 240 from vertically displacing relative to the plate 210.

In various embodiments, the first end 315A and the second end 315B of the recess 310 define the size of the opening (e.g., opening 160A or 160B) formed by the head mounted display 110, head strap 120, and telescoping strap adjuster 130. Specifically, when the protrusion of the plate 210 contacts the first end 315A of the recess 310, a larger linear distance (e.g., a linear distance such as D1 or D2 shown in FIGS. 1A and 1B) exists between the coupling points 135 and 145 in comparison to a smaller linear distance when the protrusion of the plate 210 contacts the second end 315B of the recess 310. In various embodiments, when the protrusion of the plate 210 contacts the second end 315B of the recess 310, the telescoping strap adjusters 130A and 130B are in an extended configuration, which is described above in reference to FIG. 1A.

The cylinder 230, piston rod 235, and dial 250 control the positioning of the slider 240 relative to the plate 210 and brace 220, thereby controlling the size of the opening (e.g., opening 160A or 160B) formed by the head mounted display 110, head strap 120, and telescoping strap adjuster 130. Other features of the outer cylinder 230, piston rod 235, and dial 250 are discussed in relation to FIG. 4, which depicts a cutaway perspective view of the telescoping strap adjuster 130, in accordance with an embodiment. Additionally, reference will be made to FIG. 5, which depicts a zoomed in, cutaway perspective view of the telescoping strap adjuster 130, in accordance with an embodiment.

Figure 4:
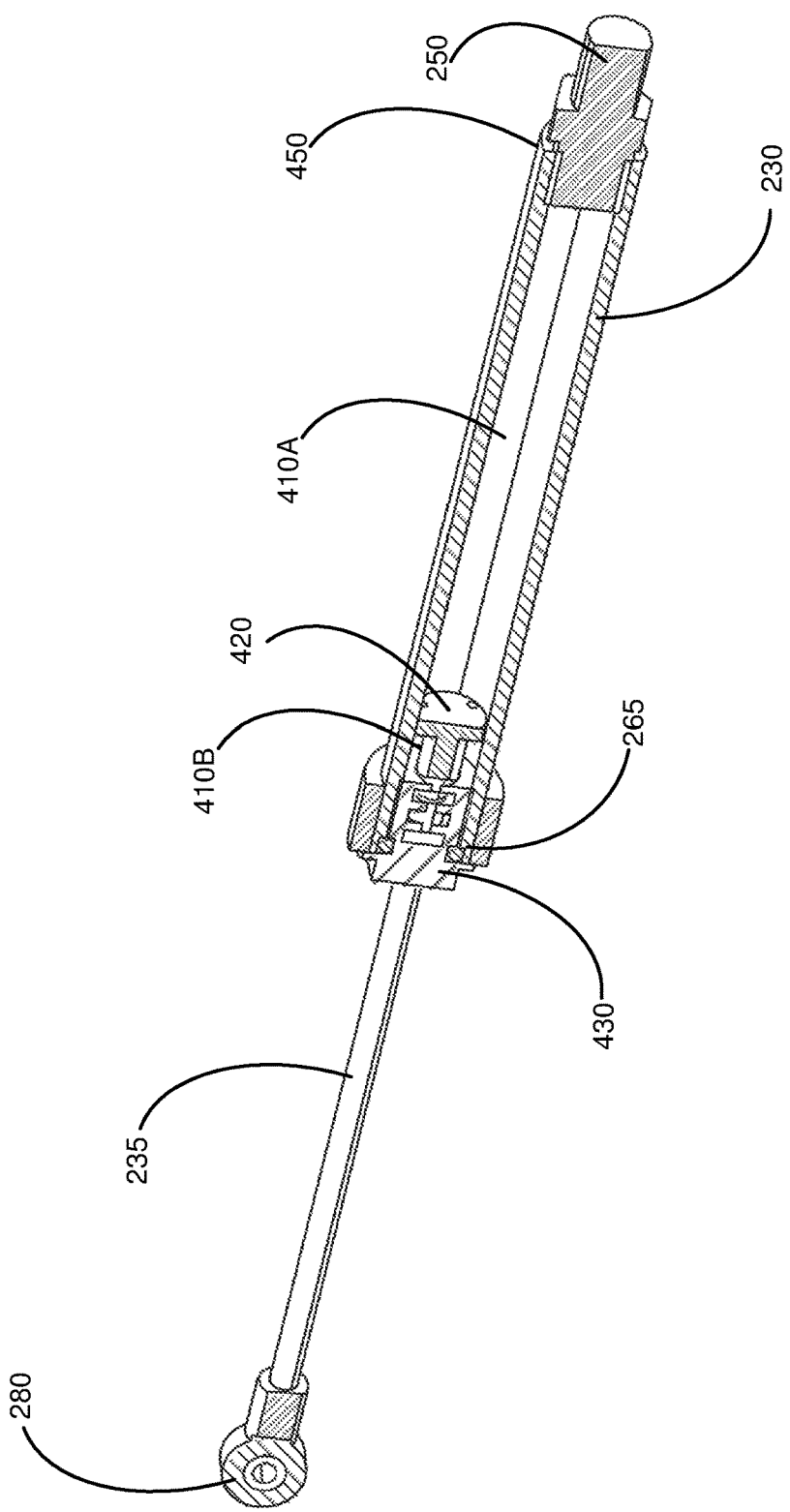
FIG. 4 is a cutaway perspective view of the telescoping strap adjuster, in accordance with an embodiment.

As shown in FIG. 4, the piston rod 235 includes a ringed end 280 and a second end 420 whereas the cylinder 230 also includes a first end 450 and a second end 265. The cylinder 230 includes a hollow interior that is similarly cylindrically shaped. The cylinder 230 further includes a cap 430 situated at the second end 265 of the cylinder 230. Additionally, the dial 250 is located at the first end 450 of the cylinder 230.

Referring first to the piston rod 235, as described above, the ringed end 280 of the piston rod 235 is coupled to the slider 240 through the slider coupler 225. Additionally, as shown in FIG. 4, a portion of the piston rod 235 passes through the cap 430 such that the second end 420 of the piston rod 235 resides within the hollow interior of the cylinder 230. In various embodiments, the second end 420 of the piston rod 235 is cylindrically shaped with an outer diameter that matches the diameter of the hollow interior of the cylinder 230.

Figure 5:
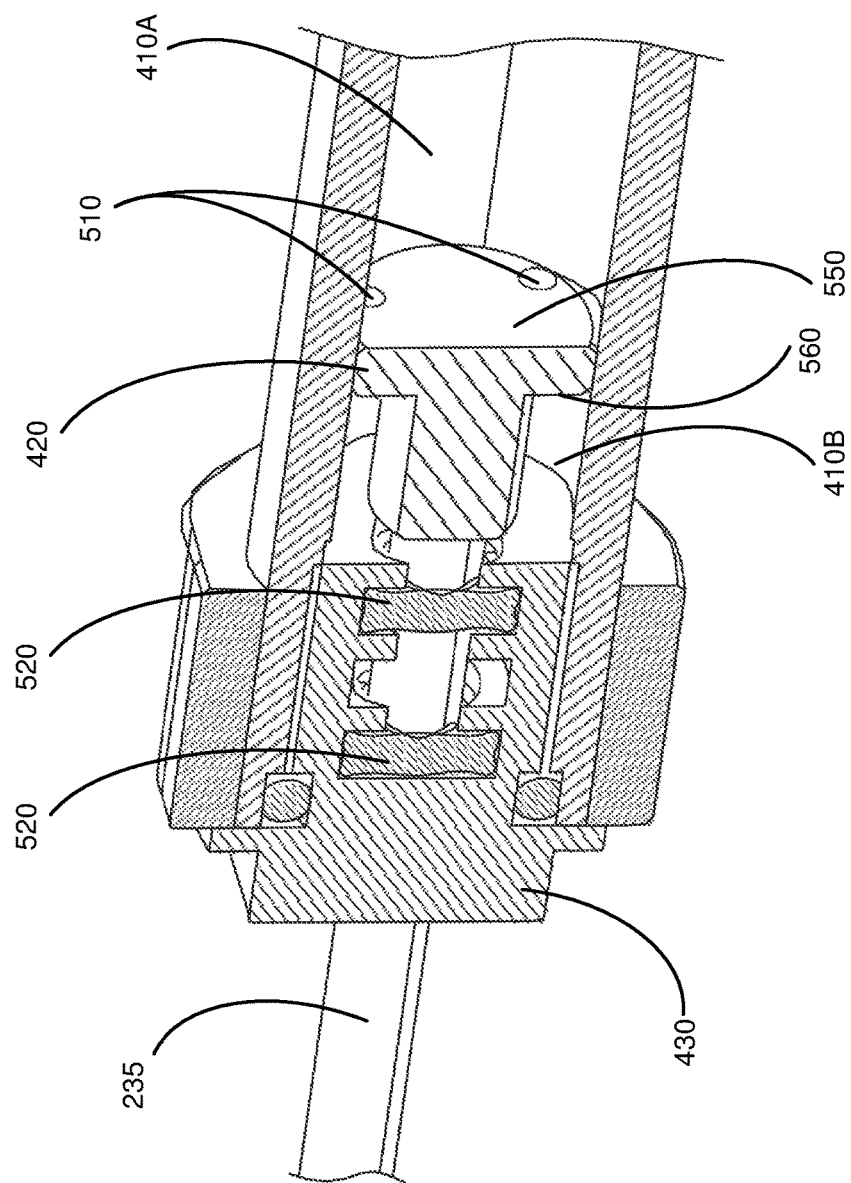
FIG. 5 is a zoomed version of a cutaway perspective view of the telescoping strap adjuster, in accordance with an embodiment.

The cylinder 230 includes a hollow cylindrical interior that is separated into two separate volumes. As shown in FIG. 4, the second end 420 of the piston rod 235 partitions the hollow interior of the cylinder 230 into a first volume 410A and a second volume 410B. As shown in FIG. 4, the first volume 410A is located proximal to the dial 250 in relation to the second volume 410B. Each of the first volume 410A and second volume 410B of the cylinder 230 may include a fluid, such as a gas. Examples of gases can include dry air, nitrogen gas, oxygen gas, and carbon dioxide. Other examples of fluids can include water. Referring briefly to FIG. 5, the first volume 410A and second volume 410B of the cylinder 230 may be fluidically connected to one another through one or more through-holes 510 located on the second end 420 of the piston rod 235. As described below in further detail, the one or more through-holes 510 enable the function of the telescoping strap adjuster 130A or 130B.

Returning to FIG. 4, each of the cap 430 and the dial 250 are configured to seal off the hollow interior of the cylinder 230 from the external environment. In other words, the hollow interior of the cylinder 230 is a closed system. For example, the cap 430 and the dial 250 may each include a portion that is cylindrically shaped, each cylindrically shaped portion of the cap 430 and the dial 250 having an outer diameter that matches the diameter of the hollow interior of the cylinder 230. Therefore, the cylindrically shaped portion of the cap 430 seals off the hollow interior of the cylinder 230 at the second end 265 of the cylinder. Similarly, the cylindrically shaped portion of the dial 250 seals off the hollow interior of the cylinder 230 at the first end 450 of the cylinder 230.

The cap 430 can further include elements that assist in sealing the hollow interior of the cylinder 230. As shown in FIG. 5, the cap 430 can include one or more sealants 520, such as one or more O-ring structures. Each of the one or more sealants 520 is configured with a center hole through which the piston rod 235 passes. Therefore, the one or more sealants 520 prevents any fluid located within the second volume 410B of the cylinder 230 from exiting through the second end 265 of the cylinder 230 along the piston rod 235.

Specifically, FIG. 5 depicts two sealants 520 located within the cap 430. In various embodiments, a fluid, such as an oil, can be located between the two sealants 520. Therefore, the oil can lubricate the interface between the sealants and the piston rod 235, thereby enabling the piston rod 235 to pass through the sealants 520.

The dial 250 controls the available volume of the hollow interior of the cylinder 230. Given that the hollow interior of the cylinder 230 is a closed system, adjusting the available volume of the hollow interior causes the fluid stored within the first volume 410A and the second volume 410B to be compressed or expanded, depending on the direction of adjustment of the dial 250. Given that each of the telescoping strap adjuster 130A and 130B is embodied as a gas spring, adjusting the available volume of the hollow interior changes the spring constant of the gas spring.

In one embodiment, the dial 250 is coupled to the first end 450 of the cylinder 230 through a threaded connection. Therefore, as the threaded connection is tightened, the dial 250 reduces the volume of the hollow interior, thereby compressing the fluid stored within the hollow interior. Conversely, as the threaded connection is loosened, the dial 250 increases the volume of hollow interior, thereby enabling the fluid stored within the hollow interior to expand. In other embodiments, the dial 250 can be differently configured to adjust the volume of the hollow interior of the cylinder 230.

Adjusting the Spring Constant of the Telescoping Strap Adjuster

As stated above, the telescoping strap adjuster 130A or 130B can be embodied as a gas spring and therefore, has a spring constant. In various embodiments, the spring constant of the telescoping strap adjuster 130A or 130B can be tailored to suit the needs of the user. For example, the spring constant of the telescoping strap adjuster 130A and 130B determines the tightness or looseness of the head strap 120 when worn by an individual. Specifically, a higher spring constant of the telescoping strap adjuster 130A and 130B corresponds to an increased tightness of the head strap 120 whereas a lower spring constant corresponds to an increased looseness of the head strap 120. Additionally, the spring constant of the telescoping strap adjuster 130A and 130B determines how rapidly the piston rod 235 of the telescoping strap adjuster 130A or 130B translationally displaces to change from a compressed configuration to an extended configuration. Specifically, a higher spring constant increases the speed at which the telescoping strap adjuster 130A or 130B translationally displaces whereas a smaller spring constant decreases the speed at which the telescoping strap adjuster 130A or 130B translationally displaces.

Referring to FIG. 5, the piston rod 235 is positioned relative to the cylinder 230 such that the telescoping strap adjuster 130A or 130B is in or near the extended configuration. As stated above, the extended configuration is the default configuration of the telescoping strap adjuster 130A or 130B. The second end 420 of the piston rod 235 includes one or more through-holes 510 that play a role in establishing the extended configuration of the telescoping strap adjuster 130A or 130B. Specifically, the through-holes 510 enable a fluidic connection between the first volume 410A and second volume 410B of the cylinder 230. Given the fluidic connection, fluid in the first volume 410A applies a pressure on a first face 550 of the second end 420 while fluid in the second volume 410B applies the same pressure onto a second face 560 of the second end 420. However, given a larger surface area the first face 550 in comparison to the second face 560, the application of the same pressure on both faces 550 and 560 causes a resultant force vector that is applied on the piston rod 235. Specifically, the force vector is directed towards the cap 430 located at the second end 265 of the cylinder 230 and away from the first end 450 of the cylinder 230. This resultant force vector causes the telescoping strap adjuster 130A and 130B to achieve the default, extended configuration.

Given that the surface areas of each of the first face 550 and second face 560 impact the resultant force vector that is applied on the piston rod 235, the particular surface area of each face 550 and 560 can be designed to tailor the spring constant of the telescoping strap adjuster 130A or 130B. For example, assume that the first face 550 has a surface area of $A_1$ and the second face 560 has a surface area of $A_2$. Generally, the surface area of $A_1$ is larger than the surface area of $A_2$ because of the presence of the rod that reduces the surface area available on the second face 560. Expressed differently, the ratio of $$\frac{A_1}{A_2}$$

is greater than 1. The ration of $$\frac{A_1}{A_2}$$

can be increased or decreased to adjust the spring constant of the telescoping strap adjuster 130A or 130B. Namely, increasing the ratio of $$\frac{A_1}{A_2}$$

increases the spring constant whereas decreasing the ratio of $$\frac{A_1}{A_2}$$

decreases the spring constant. In one embodiment, the ratio of $$\frac{A_1}{A_2}$$

can be tailored by adjusting the diameter of the piston rod 235.

As described above, the dial 250 can be used to tailor the volume of the hollow interior of the cylinder 230. Thus, adjusting the dial 250 can adjust the spring constant of the telescoping strap adjuster 130A or 130B. Specifically, if the dial 250 is adjusted to increase the volume of the hollow interior, the fluid within the hollow interior can expand. In other words, adjusting the dial 250 to increase the volume of the hollow interior decreases the spring constant. Conversely, if the dial 250 is adjusted to decrease the volume of the hollow interior, the fluid within the hollow interior is compressed, thereby increasing the spring constant of the telescoping strap adjuster 130A or 130B.

What is claimed is:

1. A telescoping strap adjuster comprising:
a slider configured to couple with a head strap and slidable relative to a head-mounted display in a first direction or a second direction to increase or decrease a distance between the head strap and the head-mounted display;
a piston rod comprising:
a first end configured to couple with the slider, and
a second end at an opposite side of the first end;
a cylinder having an opening through which the piston rod passes through and a hollow interior connected to the opening, the second end of the piston movable within the hollow interior and defining a first volume of the hollow interior and a second volume of the hollow interior, the first volume between the second end of the piston rod and a first end of the cylinder, the second volume located between the second end of the piston rod and a second end of the cylinder and located further away from the first end of the piston rod than the first end of the cylinder; and
an adjustable dial coupled to the second end of the cylinder and movable relative to the cylinder to set a volume of the hollow interior of the cylinder.

2. The telescoping strap adjuster of claim 1, further comprising:
a plate configured to couple with the head mounted display; and
a brace configured to couple with the plate.

3. The telescoping strap adjuster of claim 2, wherein the brace couples with the plate at a first end of the plate and wherein the plate couples with the head mounted display at a second end of the plate that is opposite the first end of the plate.

4. The telescoping strap adjuster of claim 2, wherein a portion of the brace is substantially curved to form a gap between the plate and the brace, wherein the slider translationally displaces through the gap.

5. The telescoping strap adjuster of claim 2, wherein the brace is coupled to a clamp which is further coupled to the cylinder.

6. The telescoping strap adjuster of claim 2, wherein the plate comprises one or more guides, each guide directing a translational motion of the slider.

7. The telescoping strap adjuster of claim 1, further comprising a cap coupled to the second end of the cylinder.

8. The telescoping strap adjuster of claim 7, wherein the cap comprises one or more sealants, wherein the piston rod passes through the one or more sealants of the cap.

9. The telescoping strap adjuster of claim 1, wherein the first volume and the second volume of the hollow interior of the cylinder each contain nitrogen gas.

10. The telescoping strap adjuster of claim 1, wherein the second end of the piston rod comprises one or more through-holes that fluidically connects the first volume and the second volume of the hollow interior of the cylinder.

11. A head mounted display system comprising:
a head mounted display;
a head strap coupled to the head mounted display; and
a slider configured to couple with a head strap and slidable relative to a head-mounted display in a first direction or a second direction to increase or decrease a distance between the head strap and the head-mounted display;
a piston rod comprising:
a first end configured to couple with the slider; and
a second end at an opposite side of the first end;
a cylinder having an opening through which the piston rod passes through and a hollow interior connected to the opening, the second end of the piston movable within the hollow interior and defining a first volume of the hollow interior and a second volume of the hollow interior, the first volume between the second end of the piston rod and a first end of the cylinder, the second volume located between the second end of the piston rod and a second end of the cylinder and located further away from the first end of the piston rod than the first end of the cylinder; and
an adjustable dial coupled to the second end of the cylinder and movable relative to the cylinder to set a volume of the hollow interior of the cylinder.

12. The head mounted display system of claim 11, wherein the head strap further comprises:
a plate configured to couple with the head mounted display; and
a brace configured to couple with the plate.

13. The head mounted display system of claim 12, wherein the brace couples with the plate at a first end of the plate and wherein the plate couples with the head mounted display at a second end of the plate that is opposite the first end of the plate.

14. The head mounted display system of claim 12, wherein a portion of the brace is substantially curved to form a gap between the plate and the brace, wherein the slider translationally displaces through the gap.

15. The head mounted display system of claim 12, wherein the brace is coupled to a clamp which is further coupled to the cylinder.

16. The head mounted display system of claim 12, wherein the plate comprises one or more guides, each guide directing a translational motion of the slider.

17. The head mounted display system of claim 11, wherein the head strap further comprises a cap coupled to a second end of the cylinder.

18. The head mounted display system of claim 17, wherein the cap comprises one or more sealants, wherein the piston rod passes through the one or more sealants of the cap.

19. The head mounted display system of claim 11, wherein the first volume and the second volume of the hollow interior of the cylinder each contain nitrogen gas.

20. The head mounted display system of claim 11, wherein the second end of the piston rod comprises one or more through-holes that fluidically connects the first volume and the second volume of the hollow interior of the cylinder.

* * * * *